May 10, 1966 M. TRUPP 3,250,496

PROPULSION SYSTEM

Filed Sept. 10, 1964 3 Sheets-Sheet 1

INVENTOR
MASON TRUPP

BY Sherman Levy ATTORNEY

May 10, 1966  M. TRUPP  3,250,496
PROPULSION SYSTEM
Filed Sept. 10, 1964  3 Sheets-Sheet 2

INVENTOR
MASON TRUPP

BY *Sherman Lew* ATTORNEY

May 10, 1966  M. TRUPP  3,250,496

PROPULSION SYSTEM

Filed Sept. 10, 1964  3 Sheets-Sheet 3

INVENTOR
MASON TRUPP

BY *Sherman Levy*

ATTORNEY

United States Patent Office 3,250,496
Patented May 10, 1966

3,250,496
PROPULSION SYSTEM
Mason Trupp, 310 Blanca Lane, Tampa 6, Fla.
Filed Sept. 10, 1964, Ser. No. 395,535
7 Claims. (Cl. 244—62)

The present invention relates to a propulsion mechanism or system, and the present invention is a continuation-in-part of patent application Serial No. 372,178, filed June 3, 1964.

An object of the present invention is to provide a compound photonic jet propulsion unit which is adapted to not only provide a means for propelling a vehicle or aircraft, but in addition provides a means for guiding or steering the vehicle, aircraft or the like.

Another object is to provide a device of the character described that may be utilized in a conventional type of aircraft, or it can be used in a vehicle, flying saucer or the like.

Further objects and advantages are to provide improved elements and arrangements thereof in a device of the character described that is relatively economical to produce, durable in form, and conducive to the most economical use of materials and uniformity of members formed therefrom, and still further objects and advantages will become apparent in the subsequent description in the specification.

Figure 1:
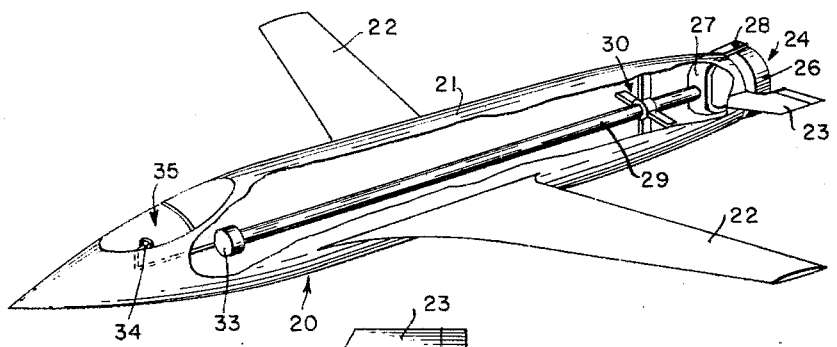
FIG. 1 is a perspective view of an aircraft, with the compound photonic jet propulsion unit extending outwardly from the rear end of the aircraft and with the device movable to control movement such as lateral directional changes of the aircraft, and with parts broken away for clarity of illustration.
Figure 2:
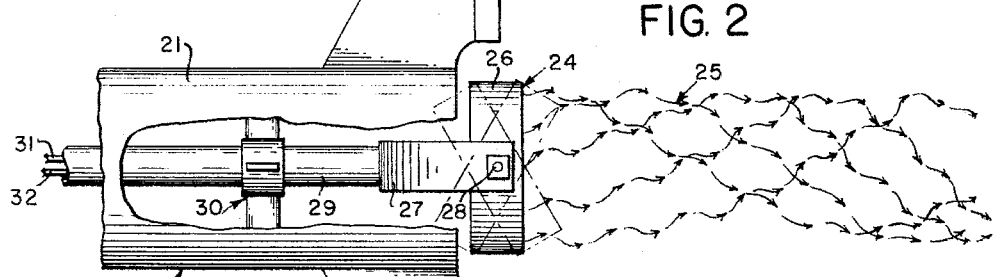
FIG. 2 is a fragmentary enlarged top plan view showing the present invention, and with parts broken away.

Referring in detail to the drawings, and more particularly to FIGS. 1 and 2 of the drawings, the numeral 20 indicates an aircraft of the type that includes a fuselage 21, and the numerals 22 indicate wings, and there is further provided a tail structure that includes horizontal stabilizers 23.

The numeral 24 indicates the compound photonic jet propulsion unit of the present invention which is adapted to produce a compound wake as indicated by the numeral 25 in FIG. 2, and the unit 24 includes a circular housing 26 which is adapted to have a console rotatably mounted therein, and the console is adapted to have a plurality of jet engines positioned therein as later described in this application. The housing 26 is pivotally and swingably mounted in a semi-circular yoke 27 as at 28, and the numeral 29 indicates a standard which has its rear end suitably affixed to the yoke 27, and the standard 29 extends through the major portion of the fuselage 21 and has its longitudinal axis parallel to the longitudinal axis of the fuselage as shown in FIG. 1. The standard 29 is adapted to be rotatably supported in one or more spider-like supports 30, and the numerals 31 and 32 indicate lines or conduits which are adapted to extend through the standard 29 for supplying fuel and hydraulic fluid under pressure from a suitable source of supply to the unit 24.

As shown in FIG. 1, a control unit which may be a gear arrangement 33 is adapted to be provided for controlling rotation of the standard 29, and a control element 34 is positioned contiguous to the cockpit or pilot's compartment 35.

Figure 3:
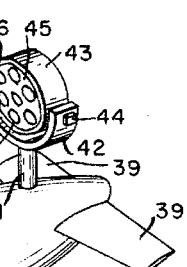
FIG. 3 is a fragmentary perspective view illustrating a modification and showing the compound photonic jet propulsion unit mounted on a top of a fuselage toward the rear thereof.

Attention is now directed to FIG. 3 of the drawings wherein the numeral 36 indicates an aircraft of the type that includes a fuselage 37 as well as wings 38 and horizontal stabilizers 39, and the numeral 40 indicates the compound photonic jet propulsion unit of the present invention which embodies a generally vertically disposed standard 41 which is adapted to extend through the rear portion of the fuselage 37, and the standard 41 may have auxiliary landing gear connected to its lower end. A semi-circular yoke 42 is suitably connected to the upper end of the standard 41, and the numeral 43 indicates a circular housing which is pivotally and swingably connected to the yoke 42 as at 44. A circular console 45 is rotatably mounted in the housing 43, and the console 45 has a plurality of jet engines 46 mounted therein. The numeral 47 indicates the pilot's compartment of the aircraft 36.

Figures 4, 5:
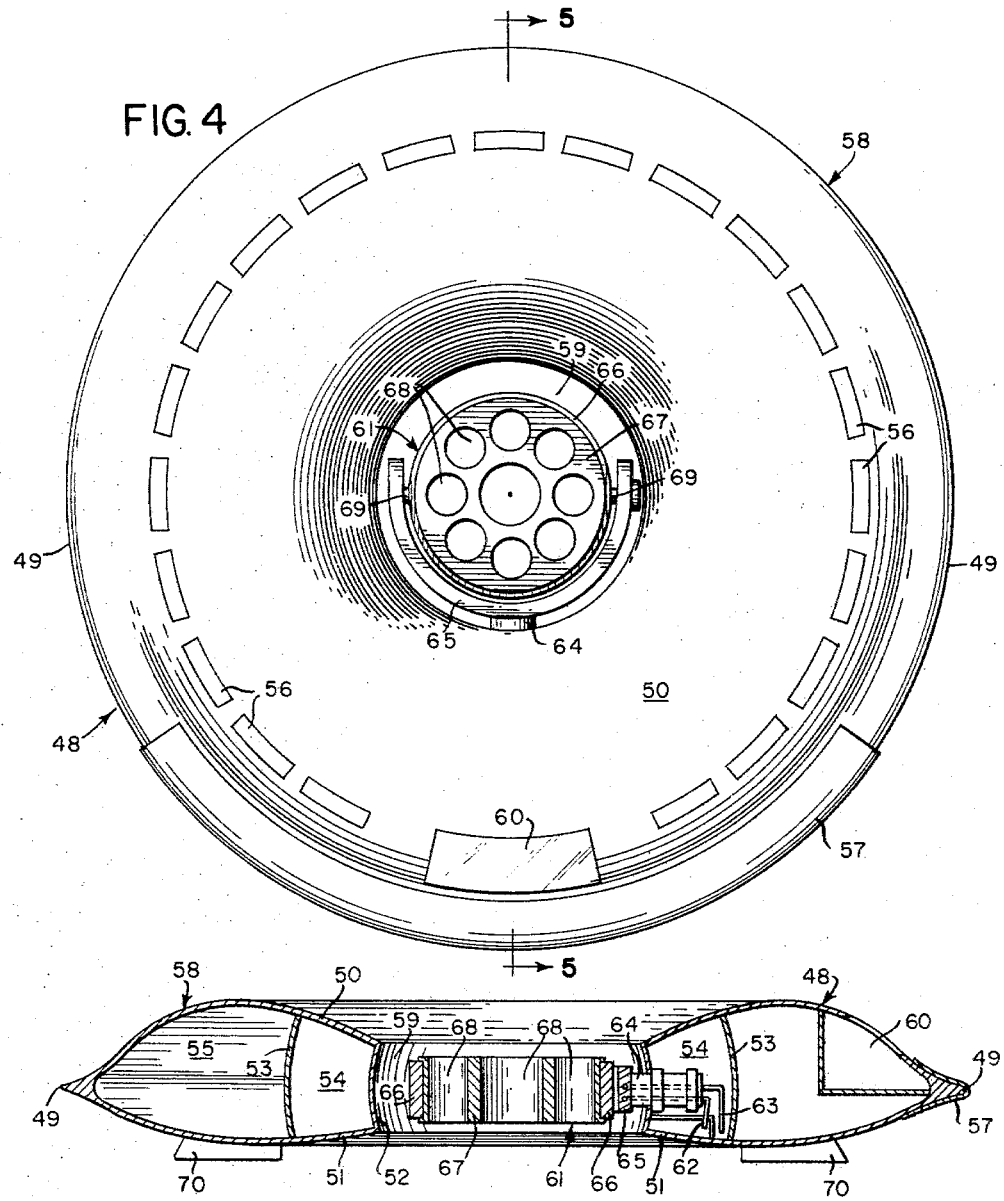
FIG. 4 is a top plan view of a further modification showing the compound photonic jet propulsion unit mounted in a flying saucer type of aircraft.
FIG. 5 is a sectional view taken on the line 5—5 of FIG. 4.

Attention is now directed to FIGS. 4 and 5 of the drawings wherein there is illustrated a biconcave flying saucer which is indicated generally by the numeral 48, and the flying saucer type of aircraft 48 comprises a disk-shaped annular body member 58 which has an arcuate outer periphery indicated by the numeral 49 as well as inwardly directed arcuate top and bottom surfaces 50 and 51 and there is also provided an inner arcuate wall surface indicated by the numeral 52. The inner central portion of the body member 58 is open as indicated by the numeral 59 for a purpose to be later described.

The numeral 53 indicates a partition or baffle which is adapted to be arranged within the body member 58, and the partition 53 may be of arcuate formation in cross-section as shown in FIG. 5 and is adapted to define within the hollow body member 58 a compartment 54 for fuel and the like, as well as a compartment or chamber 55 for cargo, passengers or the like. The numeral 56 indicates windows which may be arranged contiguous to the passenger compartment 55, and the numeral 57 indicates a re-entry shield, and the numeral 60 indicates the pilot control compartment or cock-pit.

The numeral 61 indicates the compound photonic jet propulsion unit and the numerals 62 and 63 indicate lines or conduits for supplying hydraulic fluid and fuel for the unit 61, FIG. 5. There is further provided a standard 64 which has the semi-circular yoke 65 connected thereto, and the numeral 66 indicates a housing which is pivotally and swingably connected to the yoke 65 as at 69. A console 67 of circular formation is rotatably mounted in the housing 66, and a plurality of jet engines 68 are suitably mounted in the console 67.

From the foregoing, it will be seen that there has been provided a propulsion system which is an improvement over prior propulsion systems, and the present invention is a continuation-in-part of prior patent application Serial No. 372,178, filed June 3, 1964.

In use, with the parts arranged as shown in the drawings and in particular as shown in FIGS. 1 and 2 of the drawings, it will be seen that with the compound photonic jet propulsion unit 24 mounted in the rear of the aircraft 20, and with fuel from a suitable source of supply supplied to the jet engines in the console, when the aircraft is operating, a compound wake 25 such as that shown in FIG. 2 will be produced, and this compound wake results from the combined individual wakes or exhausts from the individual jet engines. The control element 34 for the unit 24 is adapted to be arranged convenient to the pilot's compartment 35, and a suitable means can be provided for operating the gear mechanism 33 so that the standard 29 can be rotated in its support 30 whereby the entire unit 24 can be turned or rotated about an axis extending through the standard 29 as the standard 29 is rotated. Similarly, by controlling the flow of hydraulic fluid through the line or conduit 32, the housing 26 can be pivoted about an axis extending through the pivot points 28 so that it will be seen that not only will the compound photonic jet propulsion unit 24 provide a source of power and propulsion, but in addition it provides a means for steering and guiding the aircraft 20. In other words, the housing 26 with the plurality of jet engines therein can be pivoted about axes extending through the pivot points 28 and in addition the standard 29 can be rotated and this arrangement permits the unit 24 to be shifted to different positions so that a means is provided for steering or guiding the aircraft. In addition, the use of the plurality of jet engines in the console of the housing 26 produces a compound wake 25 and the formation of such a wake having a compound spiral turn will result in a greatly increased thrust or propulsion means for the aircraft as, for example, as compared to the wake produced by a single jet engine.

In the arrangement shown in FIG. 3, the compound photonic jet propulsion unit 40 is mounted at the rear of the fuselage 47, and the standard 41 can be swivelled or rotated by a suitable means, and the housing 43 is pivoted in the yoke 42 as at 44, and a suitable mechanism is adapted to be provided for pivoting the housing 43 about an axis extending through the diametrically opposed pivot points 44. The console 45 rotates within the housing 43, and the console 45 carries the plurality of jet engines 46 therein, and the jet engines 46 are adapted to produce a compound wake similar to the wake 25 as shown in FIG. 2. The unit 40 eliminates need for a vertical stabilizer and thus the unit 40 not only provides a motive and propelling means but also can be used to help steer or guide the aircraft 36.

In the flying saucer or disk-like device 48 shown in FIGS. 4 and 5, the compound photonic jet propulsion unit 61 is arranged in the central opening 59 of the body member 58, and hydraulic fluid and fuel are adapted to be supplied to the unit 61 by means of the conduits 62 and 63 and these substances can be supplied from a suitable source of supply. The space 55 can be used for any desired purpose such as for the accommodation of passengers or cargo, and the space or compartment 54 serves as a fuel reservoir. It will be seen that with the device of FIGS. 4 and 5, a compound wake similar to the wake 25 will be produced from the plurality of jet engines 68 and the jet engines 68 are mounted in the console 67 and the console 67 is rotatably arranged in the housing 66, and the housing 66 is pivotally or swingably supported in the semi-circular yoke 65 by means of the pivot points 69. The numeral 70 indicates support elements for the device 48.

The compound wake 25 is of a spiral formation so that there is provided a compound spiral thrust which consists of thrusts from the individual jet engines and this provides in each instance an organized power console which functions as a single compound unit that is highly advantageous as compared to existing or presently used fixed power structures. In other words there is provided a compound spiralling wake from the unit 24 or from the unit 40 or from the unit 61 and this compound wake or thrust results from the combination of the individual wakes or thrusts from the plurality of jet engines and thus there is provided a cumulative compound thrust or wake which is the result of all the compound individual thrusts of the separate jet engines and in effect the plurality of jet engines function as a single unit to accomplish certain important advantages which are set forth in detail in patent application Serial No. 372,178. For example, the arrangement helps eliminate stresses on the airplane and provides increased torque as well as increased efficiency and smoother transition of thrust is provided and the component units supplement and complement each other rather than working against each other. The compound wake provides that there will be flight by vortex which in effect provides greater energy conversion than that which is accomplished by flight by wing lift. Also, thrust efficiency is increased and the reaction exhaust will be used in a more efficient manner. In prior application Serial No. 372,178, the compound photonic jet propulsion was used and illustrated primarily as a means for producing thrust, but in the present invention and applications, there is illustrated various ways in which the present invention can be used not only to produce thrust but also to aid in guiding or steering the aircraft or other members on which the same is mounted. Thus, in FIGS. 1 and 2, the vertical stabilizer can be omitted and by actuating or rotating the unit 24, guiding or steering of the aircraft 20 can be accomplished in the desired manner. The arrangement of the unit 40 shown in FIG. 3 also provides a means for steering the aircraft and the arrangement of FIG. 3 is such that the usual vertical stabilizer or rudder can be eliminated or reduced in size. In the modification shown in FIGS. 4 and 5, the flying saucer can be made to go up or down by properly controlling the compound wake from the jet engines 68 in the unit 61. Thus, in patent application Serial No. 372,178 there is illustrated arrangements which are primarily a motive force, but with the present invention there is a combined motive force and a directional control arrangement.

In addition, miniaturization of the present invention will permit application of the device for a small surface effect vehicle, as well as for personnel carriers in combat and the like, and it can also be used in conjunction with small compact sleds for water and terrestrial transportation. The biconcave vehicle is especially effective for high saturation safer vehicular highway traffic due to its ability to leave the paved highway for para-highway or cross country travel. The compound turbine photonic device incorporated in an automobile can be used advantageously as, for example, in a manner superior to a turbine car. Also, the device can be incorporated in a large highway van and can also be used in conjunction with tank car travel, locomotive travel and the like.

The multiple units in the compound photonic jet console will be quiet during running as compared to multiple single units because of the inherent quality of the console to produce noise that would simulate the discharge from a single engine rather than the noise coming from multiple single sources. The present invention is adapted to be used in supersonic craft or the like and is adapted to be used in miniaturization applications by the automotive industry.

With further reference to the biconcave saucer arrangement shown in FIGS. 4 and 5, in addition to the high lift advantages, the protected centrally elevated position permits landing thereof in unimproved areas such as deserts or jungles.

It is to be noted that there is a perpendicular and normal relationship of the standard to the console, and for obtaining directional and angular control for reactive movement, there is provided inclinations and declinations between perpendicular and normal to the console.

In the biconcave saucer, the standard is perpendicular and normal to the console rather than vertical, and this is also true of the use of the compound photonic jet incorporated in the tail section of conventional aircraft with the standard extending perpendicularly and normal from the console through the fuselage to the pilot's cockpit.

In the biconcave saucer, fuel under pressure is adapted to be fed into the horizontal standard after passing through the fuel tank on its way to the desired location. In FIG. 3, a landing gear mechanism is adapted to be arranged under the console and such a landing gear would not have to be as massive as the tricycle landing gear forward. In smaller craft the landing gear under the console would act as the rear wheel of the reversed tricycle landing gear, and the auxiliary landing gear would keep a fuel empty craft from tilting nose up.

With further reference to the biconcave saucer, it is to be noted that this unit acquires features of lift and flotation not inherent in a biconvex design but use of the engine in the latter designs is not eliminated from the scope of the present invention. The saucer also includes water and terrestrial landing devices.

In FIG. 3 the console or unit 40 is shown moved to the extreme rear of the fuselage to replace the vertical stabilizer, and the horizontal stabilizers 39 can be made of minimal size. The standard 41 is adapted to extend to the auxiliary landing gear in a vertical direction.

In the arrangement shown in FIG. 1, the element 33 may indicate a gear for angular control of the standard 29, and a hydraulic cell can be provided for angular control of the console. The numeral 34 may indicate a single throttle control for the compound photonic engine. Also in FIG. 1, vertical and horizontal stabilizers may be eliminated or reduced to a minimum. The standard 29 is in a horizontal position parallel to the main lines of the fuselage and fuel tanks lead directly to the cockpit of the craft.

Considering further the flying saucer, it will be noted that this is of a shape of a biconcave disk wherein its edges have a contour such that the concavity on each central surface will yield more lift and make it safer in landing, and the engine console is well above the land or water surface and the reduction of pressure in the upward concavity with jet intake above will increase lift. Cruise direction will depend on control of the whirling console and its swingable and rotating control characteristics, and the unit is easily adaptable to flying saucer vehicles which generally have fewer extruding or extending members which makes collision less dangerous than in a conventional aircraft by comparison.

In the arrangement shown in FIGS. 4 and 5, the numeral 60 indicates the pilot's control section or compartment, and the elements 70 may function as flotation and landing gear. Thus, FIGS. 4 and 5 illustrate a biconcave flying saucer with compound photonic jet propulsion.

The general design parameters for vehicles moving within plasma boundary layers should conform to the biconcave characteristics of the red blood cell in blood plasma. The above configuration operates normally in the saturation density of 5,000,000 units per cubic millimeter, under marked variations in pressure viz., arterial, venous, capillary, speed of flow within rapidly changing plasma parameters under varying changes of chemical dissociations and marked convolutional direction without sticking to each other or stagnating general flow characteristics.

It is intended that airframe design should generally conform to biconcave proportions to yield flow characteristics which yield improved speed, lift, less turbulence, and provides for reduced collision dangers which generally are due to currently multiple members which extend from present vehicular designs.

The spinning console can receive its fuel supply from the center of the console, the standard sprocketed to the central portion of the console, in which case angular direction control would depend on knuckle segmentation of the standard.

Where desired or required, special bearing alloys and polymerized plastics and metals and other materials may be used for manifolding the various parts of the unit.

With the present invention there is an important difference between the unorganized engine wake and the more substantial wake produced by the compound engine.

The general efficient design of airframe construction of large and small proportions should generally conform to biconcave proportions.

Because of the control inherent in the present invention, it may be referred to as a flying wing tunnel which adjusts to variations in altitude of airframe flight and prevents the plane from assuming any unnatural characteristics which lead to stalling, spinning, and turbulence. The above could be electronically and inertially controlled keeping the cabin in normal relation to the ground at all times.

Figure 6:
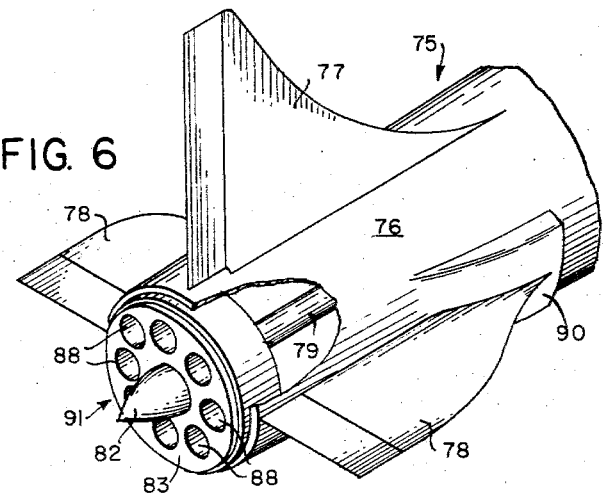
FIG. 6 is a fragmentary perspective view illustrating a further modification.
Figure 7:
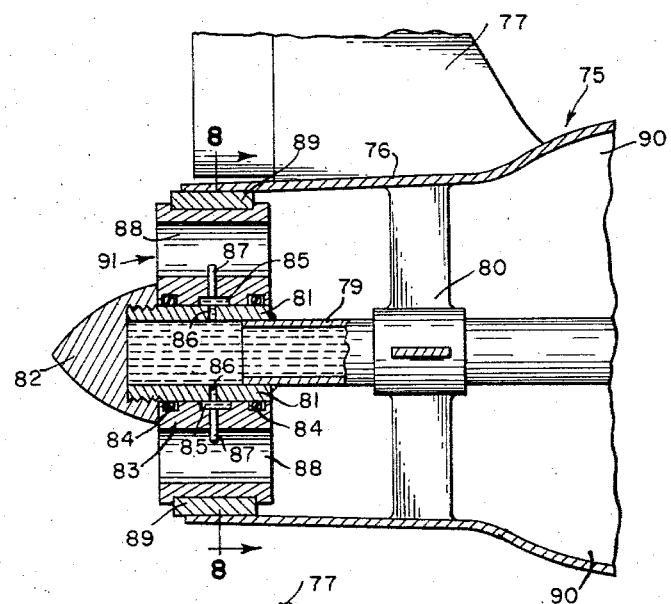
FIG. 7 is a fragmentary sectional view with parts broken away of the modification of FIG. 6.
Figure 8:
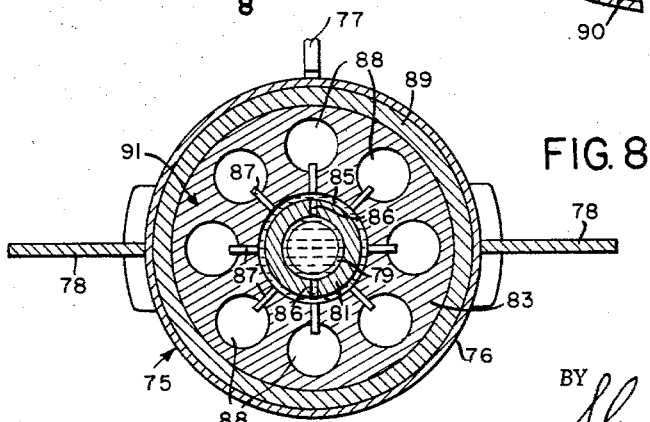
FIG. 8 is a sectional view taken on the line 8—8 of FIG. 7.

Referring now to FIGS. 6, 7 and 8 of the drawings, the numeral 75 indicates a portion of an aircraft which includes the fuselage having a tail section 76 which is provided with spaced apart scoops defining air vents as indicated by the numeral 90. The tail section is adapted to be provided with vertical and horizontal stabilizers as indicated by the numerals 77 and 78, FIG. 6.

The numeral 91 indicates a propulsion device which is mounted in the tail section of the aircraft, and there is provided a conduit or standard 79 which is adapted to be connected to a suitable source of supply of fuels, and the conduit 79 is adapted to be supported in a spider-like support unit 80, FIG. 7. The numeral 81 indicates a centrally disposed body element which is connected to the rear of the conduit 79, and a removable cap 82 is adapted to be threaded or otherwise mounted on the rear projecting end of the body element 81 as shown in the drawings.

The numeral 83 indicates a console which is rotatably mounted on the body element 81, and O rings 84 are adapted to be provided for insuring that there is a fluid tight seal between the parts such as the parts 81 and 83. The numeral 85 indicates an annular groove in the console 83, and ports 86 establish communication between the interior of the element 81 and the groove 85. There is further provided a plurality of radially disposed passageways or ports 87 which establish communication between the groove 85 and a plurality of spaced apart jet engines 88 which are mounted in and carried by the console 83. The numeral 89 indicates a circular housing which surrounds the rotary console 83.

With further reference to the arrangement shown in FIGS. 6, 7 and 8, it will be seen that fuel is adapted to be supplied from a suitable source of supply through the conduit 79 to the body element 81, and this fuel can then flow or pass out through the ports 86 and groove 85, and from the groove 85, the fuel passes through the passageways or ports 87 to the jet engines 88, and the jet engines 88 are mounted in the rotating console 83 so that there will be produced a compound wake which will have the advantages previously enumerated. The console 83 is rotatably mounted in the stationary housing 89 which is suitably affixed in the tail section 76 of the aircraft 75.

The numeral 82 indicates a cap which can be screwed on the element 81 so as to permit easy removal thereof as, for example, when the console is to be serviced. The numeral 88 indicates the propulsion devices or engines, and in FIGS. 6, 7 and 8 there is shown an arrangement which constitutes centrally fueled console. The air intake vents 90 are adapted to be arranged annularly about one end of the fuselage, and the air intake vents or apertures 90 are arranged around the fuselage of the plane to supply air to the console. The jet reaction engines 88 are mounted in the console with a central fueling arrangement. In actual practice that part of the fuselage which contains the air intake vents is adapted to work more efficiently by having the fuselage flared enough for increased air scooping. In reverse thrust, this arrangement is adapted to act in such a manner to help to brake or stop the plane on the runway. Also, the centrally fueled console is adapted to utilize vertical and horizontal stabilizers in the tail section, and the arrangement illustrated will help make the console operate with less noise.

In the present application, photonic refers not to compressors, combustion chambers and turbines, but photonic refers to the specific type of energy wave or waveform emanating from the spin of the multi-chambered console propulsion unit. The spin of the console is due to natural reaction to the torque developed within the housing. In the centrally fueled unit the console is retained by the standard. In the peripherally fueled unit the console is retained within its housing in the same manner that a turbine is retained in its housing. Because the housing extends the full length of the propulsion unit, various suitable methods including roller bearing retention means and the like can be used to prevent it from sequestering. Also with the present invention the manifolding of multiple units into a single console which is operated by a single throttle will yield greater thrust when the unit is allowed to spin by its natural torque. Further the present invention is compounded so that a single throttle energizes a plurality of individual propulsion units into a console which produces an organized, compound thrust due to the spin created and all engines work in harmony. The craft is in fact a jet propelled and energized flying gyroscope and as such it acquires the stability of the gyroscope as far as angular stability, orientation, and its capability of sustaining the dangers of turbulent air masses through which aircraft must travel at both high and low altitudes. The console whirls to produce an organized spiral thrust, and the concept of spinning the console is important and unique. Also in the present invention centrifugal, curvilinear and angular gravity accelerations are insulated from preferred straight line or tangential gravity accelerations.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

What is claimed is:

1. In an aircraft of the type that includes a fuselage and wings, and a tail structure that includes horizontal stabilizers, a compound photonic jet propulsion unit mounted on the rear of the fuselage contiguous to the horizontal stabilizers, and said compound photonic jet propulsion unit including a yoke having a housing swivelly mounted therein, a standard rotatably arranged in said fuselage and having its longitudinal axis parallel to the longitudinal axis of the fuselage, means for rotating the standard, and said compound photonic jet propulsion unit adapted to produce a compound spiral wake.

2. In an aircraft of the type that includes a fuselage and wings and horizontal stabilizers, a compound photonic jet propulsion unit arranged adjacent the rear of the fuselage and comprising a vertically disposed standard extended through the rear portion of the fuselage, a semi-circular yoke on the upper end of said standard, a circular housing pivotally and swivelly connected to said yoke, a console rotatably arranged in said housing, and said console having a plurality of jet engines mounted therein.

3. In a biconcave flying saucer, a disk-shaped annular body member provided with arcuate outer peripheral surface and said body member having inwardly directed top and bottom surfaces with an arcuate inner wall section, the inner central portion of said body member being open, a partition in said body member defining an inner compartment for fuel and an outer compartment for passengers, cargo and the like, said body member having a pilot control compartment, a compound photonic jet propulsion unit in the central portion of the body member and said compound photonic jet propulsion unit including a standard, hydraulic and fuel lines connected to the standard, a semi-circular yoke connected to said standard, a housing pivotally and swingably connected to said yoke, a console rotatably mounted within said housing, a plurality of jet engines mounted in the console that is rotatably mounted in the housing, and flotation and landing gear connected to said body member.

4. In a device of the character described, a body, a compound photonic jet propulsion unit connected to said body and including a yoke and a housing swivelly and pivotally connected to the yoke, and said housing adapted to have a console with a plurality of jet engines rotatably mounted therein, and said compound photonic jet propulsion unit providing a motive and propulsion means as well as a directional control mechanism.

5. In an aircraft, a fuselage having a plurality of spaced apart scoops defining air vents, a tail section having vertical and horizontal stabilizers, a propulsion device in the tail section comprising a conduit adapted to be connected to a source of supply of fuel, a support for said conduit, a centrally disposed body element connected to the rear of said conduit, a removable cap on said body element, spaced apart ports in said body element, a console rotatably mounted on said body element and said console having an annular groove registering with said ports, a plurality of jet reaction engines mounted in said console, passageways connecting said engines to said groove, and a circular housing surrounding said console and said housing being mounted in the tail section of said fuselage.

6. In an aircraft of the type that includes a fuselage and wings and horizontal stabilizers, a compound photonic jet propulsion unit arranged adjacent the rear of the fuselage and comprising a vertically disposed standard extended through the rear portion of the fuselage, a semi-circular yoke on the upper end of said standard, a circular housing pivotally and swivelly connected to said yoke, a console rotatably arranged in said housing, said console having a plurality of jet engines mounted therein, and means for fueling the console by a central fuel supply.

7. In an aircraft of the type that includes a fuselage and wings and horizontal stabilizers, a compound photonic jet propulsion unit arranged adjacent the rear of the fuselage and comprising a vertically disposed standard extended through the rear portion of the fuselage, a semi-circular yoke on the upper end of said standard, a circular housing pivotally and swivelly connected to said yoke, a console rotatably arranged in said housing, said console having a plurality of jet engines mounted therein, and means for fueling the console by a peripheral fuel supply.

References Cited by the Examiner

UNITED STATES PATENTS

| 2,119,369 | 5/1938 | Twining | 244—56 |
| 2,515,644 | 7/1950 | Goddard | 244—74 |
| 2,926,868 | 3/1960 | Taylor | 244—56 |
| 2,973,921 | 3/1961 | Price | 244—74 |
| 3,034,747 | 5/1962 | Lent | 244—23 |

MILTON BUCHLER, *Primary Examiner.*

FERGUS S. MIDDLETON, *Examiner.*

L. C. HALL, *Assistant Examiner.*